US011358351B2

(12) United States Patent
Chou et al.

(10) Patent No.: US 11,358,351 B2
(45) Date of Patent: Jun. 14, 2022

(54) ANTI-SPRAY JOINT STRUCTURE OF CONNECTION HOSE OF VEHICLE AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

( * ) Notice: Subject to any disclaimer, the term of this patent is extended or adjusted under 35 U.S.C. 154(b) by 0 days.

(21) Appl. No.: 17/002,735

(22) Filed: Aug. 25, 2020

(65) Prior Publication Data
US 2021/0060881 A1    Mar. 4, 2021

(51) Int. Cl.
*B29C 73/16*     (2006.01)
*F16L 37/40*    (2006.01)

(52) U.S. Cl.
CPC ............ *B29C 73/166* (2013.01); *F16L 37/40* (2013.01)

(58) Field of Classification Search
CPC ............................... F16L 37/40; B29C 73/166
See application file for complete search history.

(56) References Cited

U.S. PATENT DOCUMENTS

| 7,798,183 | B2 * | 9/2010 | Cegelski et al. ...... | B29C 73/166 |
| | | | | 141/38 |
| 9,193,229 | B2 * | 11/2015 | Hong .................... | B29C 73/166 |
| 11,046,129 | B2 * | 6/2021 | Chou et al. .......... | B29C 73/166 |

\* cited by examiner

*Primary Examiner* — Kevin L Lee

(57) ABSTRACT

An anti-spray joint structure of a connection hose of a vehicle air compressor, the vehicle air compressor contains: a box, a sealant supply can, and a connection hose. The box includes a body accommodated in the box and started by a power supply to produce compressed airs. The sealant supply can includes an open segment for accommodating chemical sealant, and the sealant supply can includes a supply tube arranged on the open segment. The connection hose includes a front connector and a rear connector. The rear connector is an anti-spray joint structure and includes a first segment and a second segment removed from and connected with the first segment, and the first segment is connected with the second segment which has a channel of different sizes and shapes so as to be applicable for different tires and to avoid eruption of the chemical sealant.

9 Claims, 10 Drawing Sheets

ANTI-SPRAY JOINT STRUCTURE OF CONNECTION HOSE OF VEHICLE AIR COMPRESSOR

FIELD OF THE INVENTION

The present invention relates to an anti-spray joint structure of a connection hose of a vehicle air compressor which is capable of inflating compressed airs and supplying chemical sealant to a tire, when the tire is broken.

BACKGROUND OF THE INVENTION

A conventional air compressor is employed to feed chemical sealant and to inflate compressed airs to a tire which is broken. After a button of a box of the conventional air compressor is turned on and the connection hose is not connected with an air nozzle of the tire, a sealant supply can is connected with the box and is electrically conductive to a DC power supply, thus causing eruption of the chemical sealant from a connector of the connection hose.

To solve such a problem, an improved air compressor has been developed. However, the anti-spray joint structure screwed with the air nozzle of the tire cannot be replaceable freely based on using requirements, such as different channels and volumes of the second end of the connector.

The present invention has arisen to mitigate and/or obviate the afore-described disadvantages.

SUMMARY OF THE INVENTION

The primary aspect of the present invention is to provide an anti-spray joint structure of a connection hose of a vehicle air compressor which contains at least one connector, and one of the at least one connector is the anti-spray joint structure and includes a first segment and a second segment removed from and connected with the first segment so as to avoid eruption of chemical sealant.

Another aspect of the present invention is to provide an anti-spray joint structure of a connection hose of a vehicle air compressor which includes a first segment and a second segment removed from and connected with the first segment easily, and the first segment is connected with the second segment which has a channel of different sizes and shapes so as to be applicable for different tires.

DETAILED DESCRIPTION OF THE PREFERRED EMBODIMENTS

Figure 1:
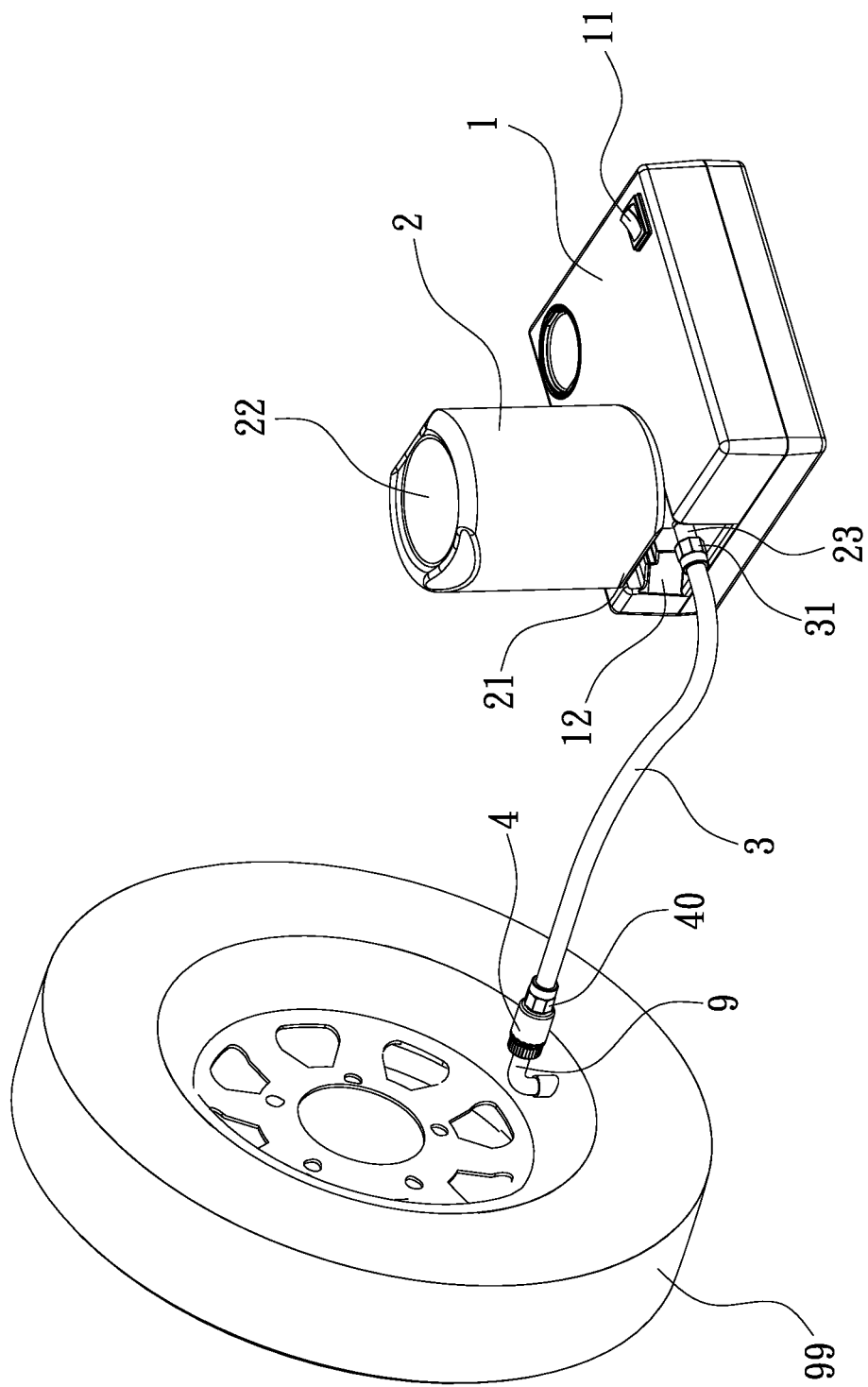
FIG. 1 is a perspective view showing the application of an anti-spray joint structure of a connection hose of a vehicle air compressor according to a preferred embodiment of the present invention.
Figure 2:
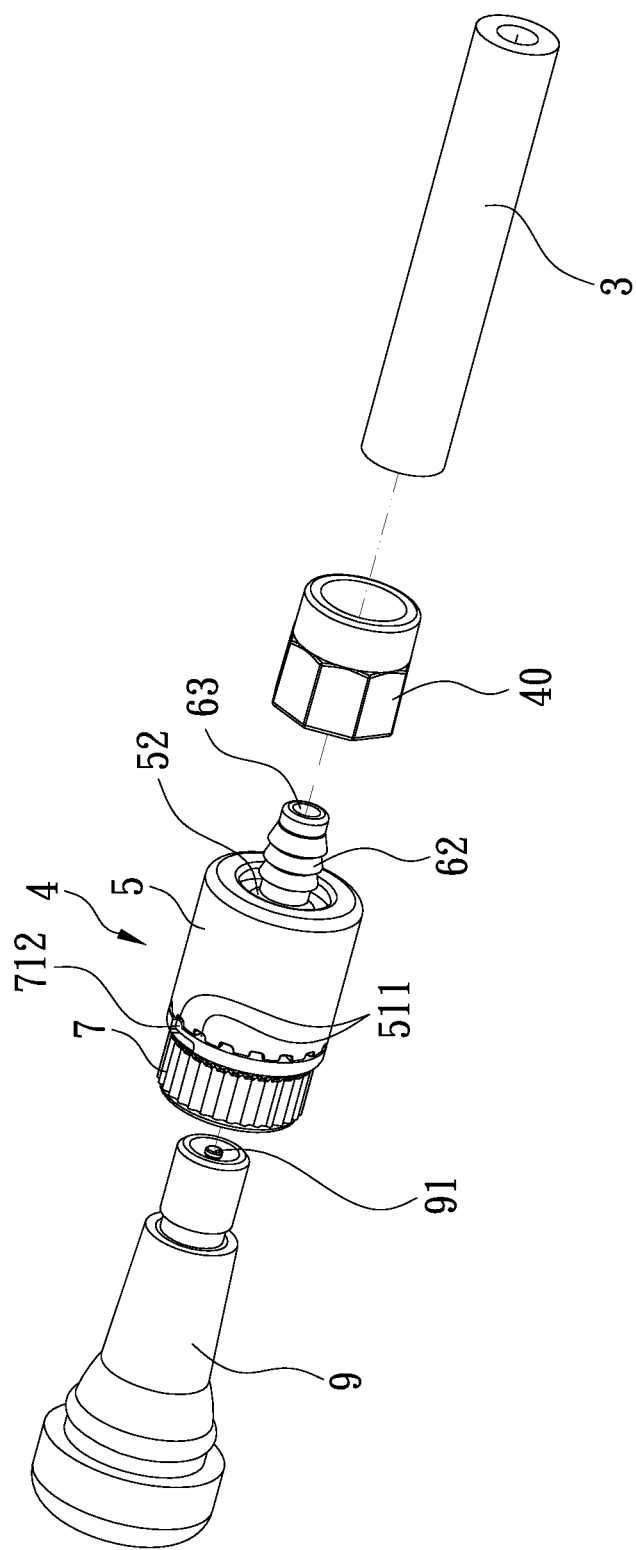
FIG. 2 is a perspective view showing the exploded components of the connection hose, the anti-spray joint structure, and an air nozzle of a tire according to the preferred embodiment of the present invention.
Figure 3:
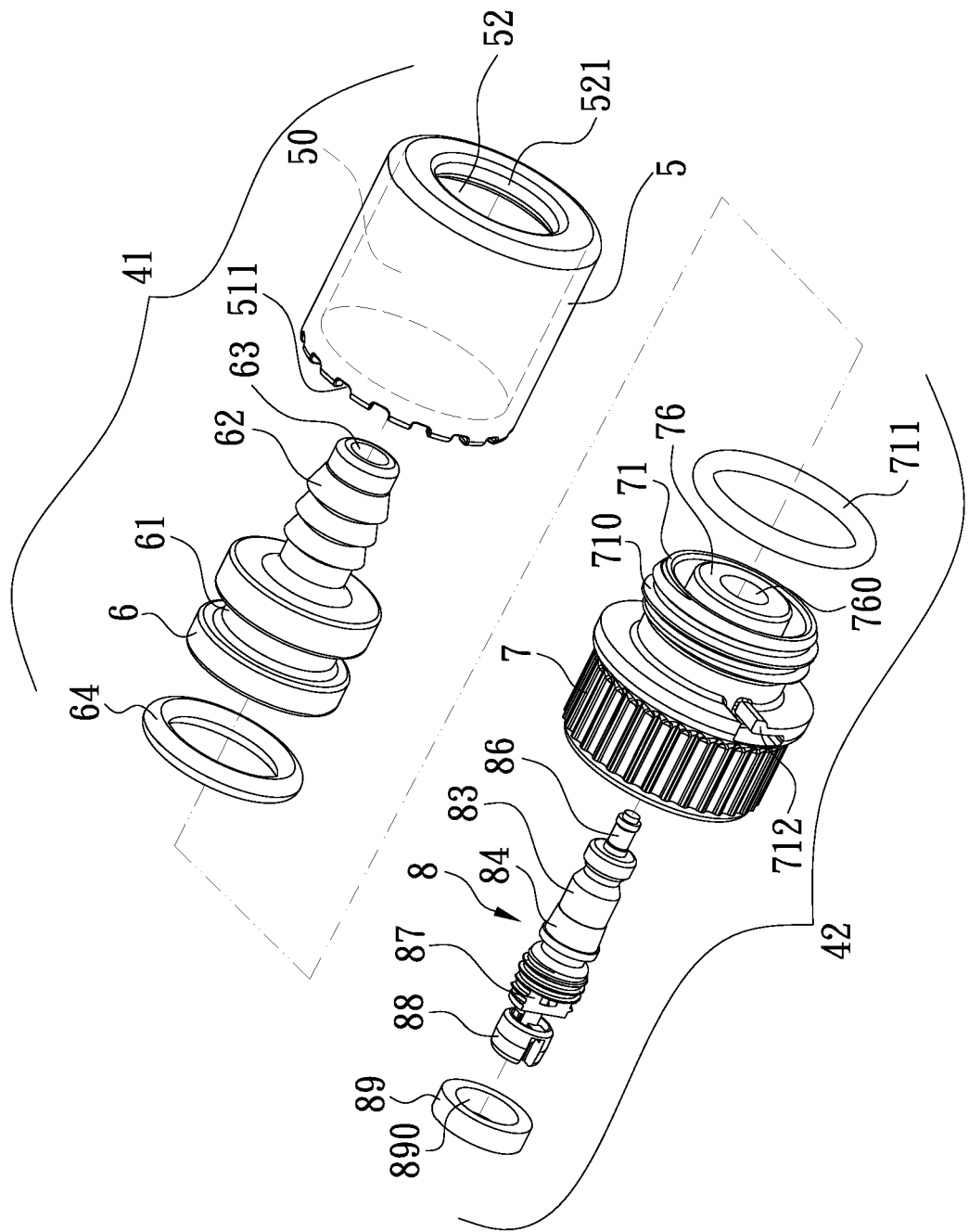
FIG. 3 is a perspective view showing the exploded components of the anti-spray joint structure according to the preferred embodiment of the present invention.

With reference to FIGS. 1-3, a vehicle air compressor according to a preferred embodiment of the present invention comprises: a box 1, a sealant supply can 2, and a connection hose 3. The box 1 includes a button 11 fixed on a top thereof, a coupling orifice 12 defined on a peripheral side thereof, and a body (not shown) accommodated in the box 1. The connection hose 3 includes a front connector 31 connected on a first end thereof, a rear connector 4 connected on a second end thereof and having an anti-spray joint structure. The sealant supply can 2 is connected on the coupling orifice 12, and the tire sealant supply can 2 includes an open segment 21 extending downward, a bottom fringe 22 extending upward, and a supply tube 23 configured to engage with the front connector 31 of the connection hose 3. The rear connector 4 is screwed with an air nozzle 9 of a tire 99, when feeding chemical sealant and inflating compressed airs to the tire 99 which is broken. After the box 1 is started by a vehicle power supply or other DC power supplies, the compressed airs of the vehicle air compressor force the chemical sealant of the sealant supply can 2 to flow into the tire 99 which is broken via the connection hose 3, thus repairing and inflating the tire 99.

Figure 5:
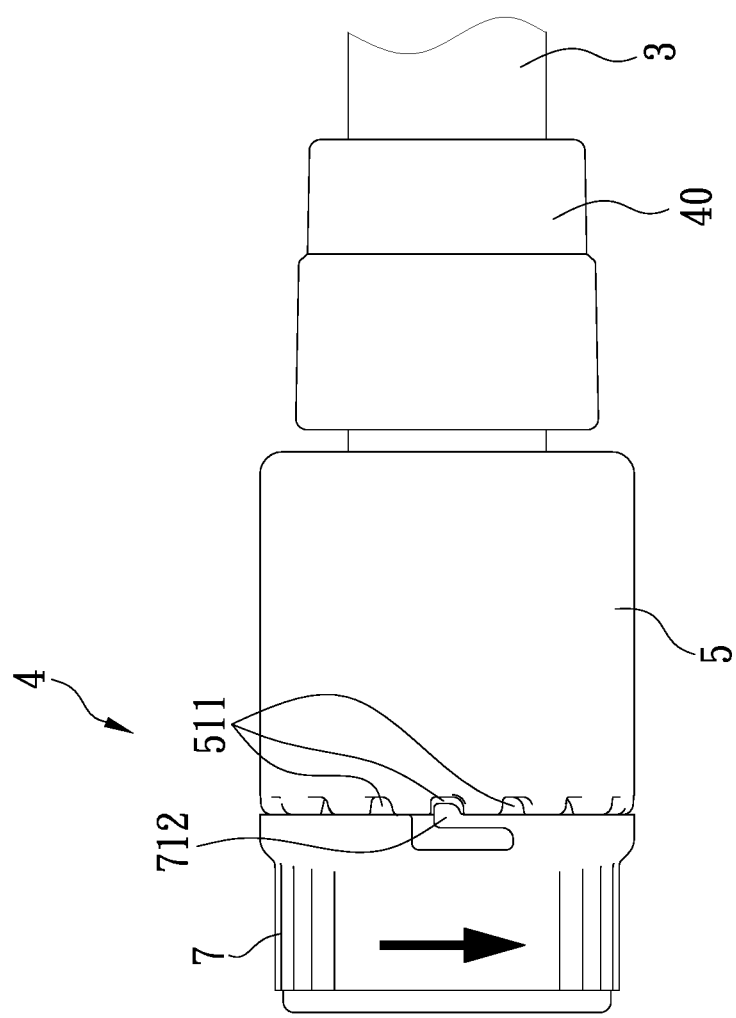
FIG. 5 is a side plan view showing the assembly of the anti-spray joint structure according to the preferred embodiment of the present invention.

Referring to FIGS. 2, 3, and 5, at least one anti-spray joint structure of the connection hose 3 of the present invention is configured to avoid eruption of the chemical sealant and is arranged on the rear connector 4, wherein a respective anti-spray joint structure includes a first segment 41 and a second segment 42 removed from and connected with the first segment 41 easily. Preferably, the first segment 41 is connected with the second segment 42 which has a channel of different sizes and shapes so as to be applicable for different tires 99.

As shown in FIGS. 3-10, the first segment 41 has a receiving seat 5 and a fitting seat 6, wherein the receiving seat 5 has a cavity 50, an opening 51 defined on a first end of the receiving seat 5, female threads 510 formed on an inner wall of the opening 51, multiple recesses 511 defined on a distal end of the opening 51, and a through hole 52 which is defined on a second end of the receiving seat 5, has a stop shoulder 521 extending inward around an inner wall of the through hole 52, and communicates with the cavity 50.

The fitting seat 6 includes a cylindrical room 60 formed in a first end thereof, a groove 61 defined around an outer wall of the fitting seat 6, a stepped fixing portion 62 extending from a second end of the fitting seat 6, a conduit 63 defined in a center of the stepped fixing portion 62 and communicating with the cylindrical room 60, a first seal ring 64 fitted on the groove 61 of the fitting seat 6.

Figure 6:
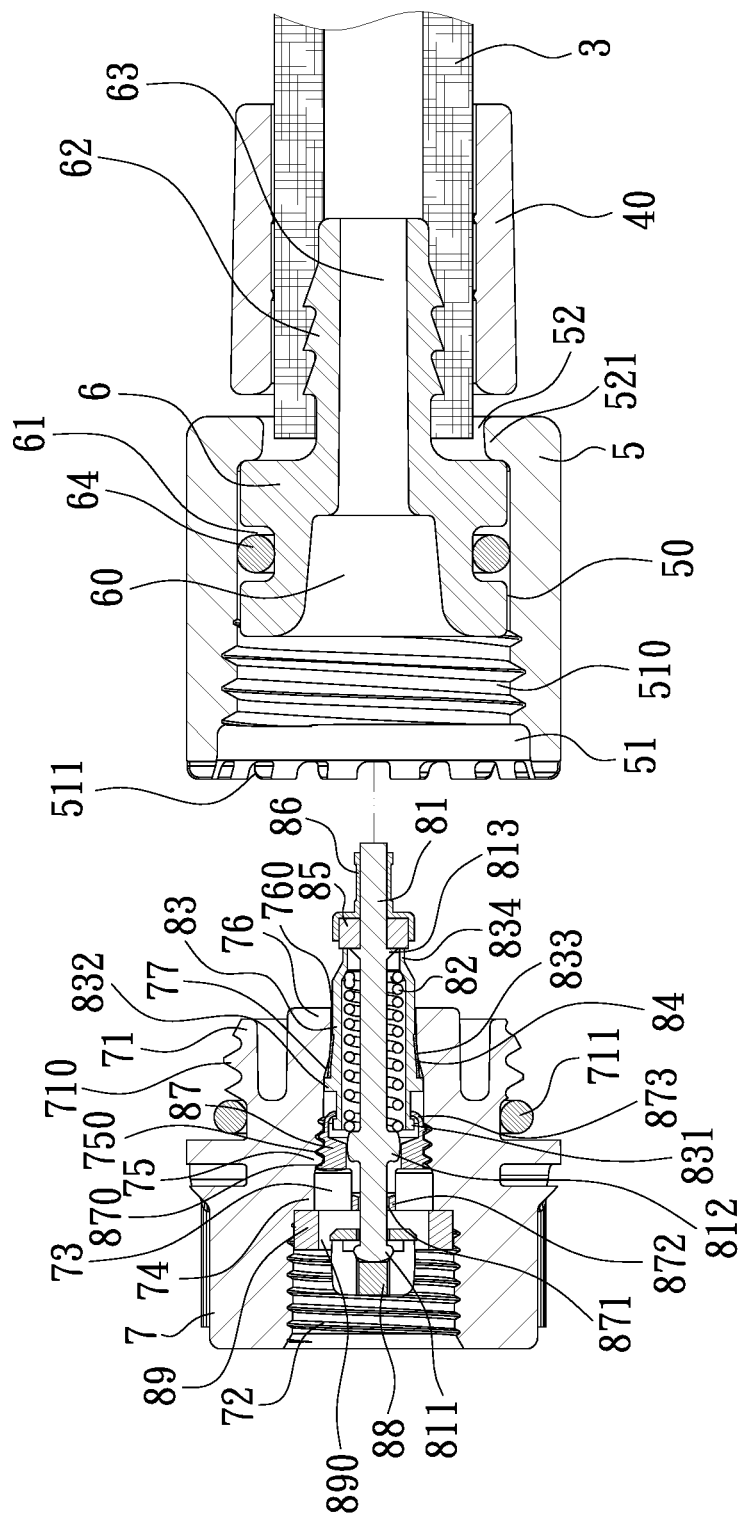
FIG. 6 is a cross sectional view showing the exploded components of a first segment and a second segment of the anti-spray joint structure according to the preferred embodiment of the present invention.
Figure 7:
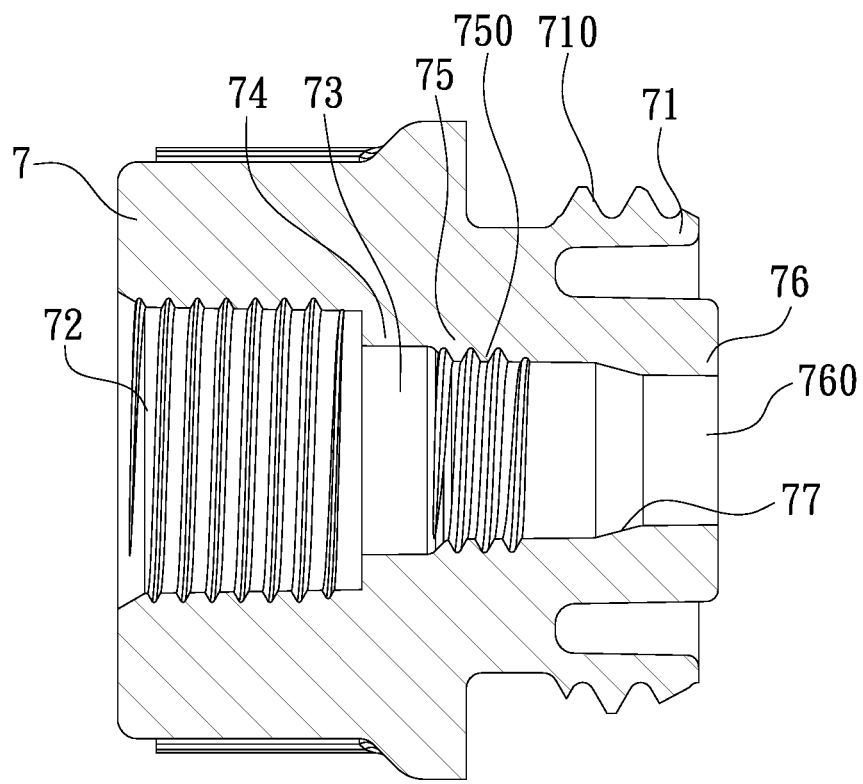
FIG. 7 is a cross sectional view showing the assembly of a cap according to the preferred embodiment of the present invention.

The stepped fixing portion 62 of the fitting seat 6 is inserted through the cavity 50 and the stop shoulder 521 of the through hole 52 from the opening 51 of the receiving seat 5 to fit with the second end of the connection hose 3, and a positioning ring 40 is configured to fix the connection hose 3 and the rear connector 4, as illustrated in FIG. 6.

The second segment 42 has a cap 7 and a valve bolt assembly 8, as shown in FIGS. 3-7, the cap 7 includes a defining segment 71 formed on a first end thereof and having male threads 710, a screw hole 72 defined on a second end of the cap 7, at least one retainer 712 surrounding an outer wall of the cap 7 between the defining segment 71 and the screw hole 72, the channel 73 extending from an end of the screw hole 72 and having a diameter which is less than a diameter of the screw hole 72, a stepped rib 74 formed between the screw hole 72 and the channel 73, a middle rib 75 extending from the stepped rib 74 away from the screw hole 72 and the channel 73, female screwing section 750 formed around an inner wall of the middle rib 75, a post 76 extending from an end of the middle rib 75 away from the female screwing section 750 and having a fixing orifice 760, and a conical fringe 77 formed between an inner wall of the post 76 and an inner wall of the middle rib 75, such that the channel 73 is formed in different sizes so as to change a volume for changing flowing quantities of the chemical sealant and the compressed airs.

Figure 4:
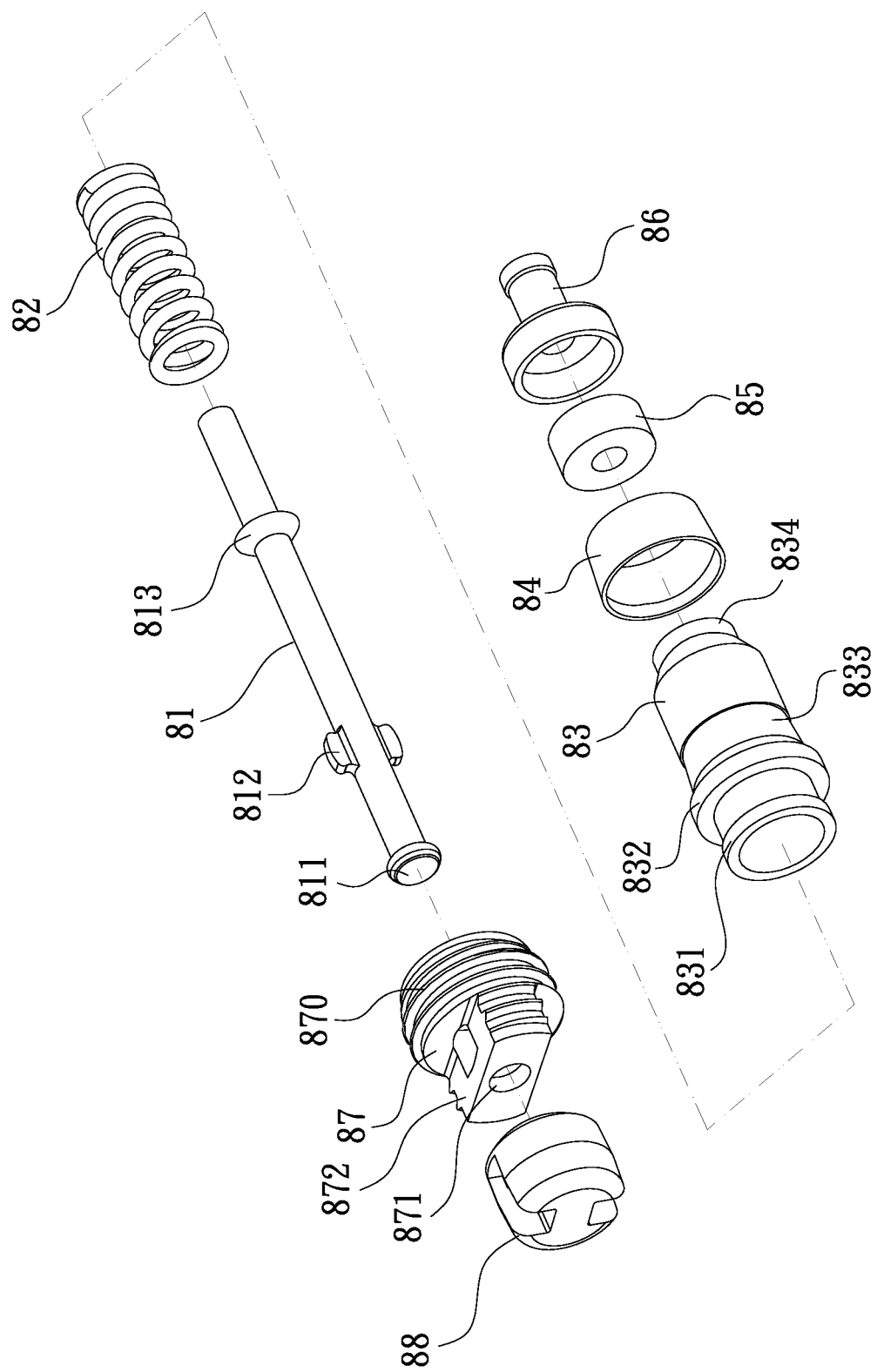
FIG. 4 is a perspective view showing the exploded components of a valve bolt assembly according to the preferred embodiment of the present invention.
Figure 8:
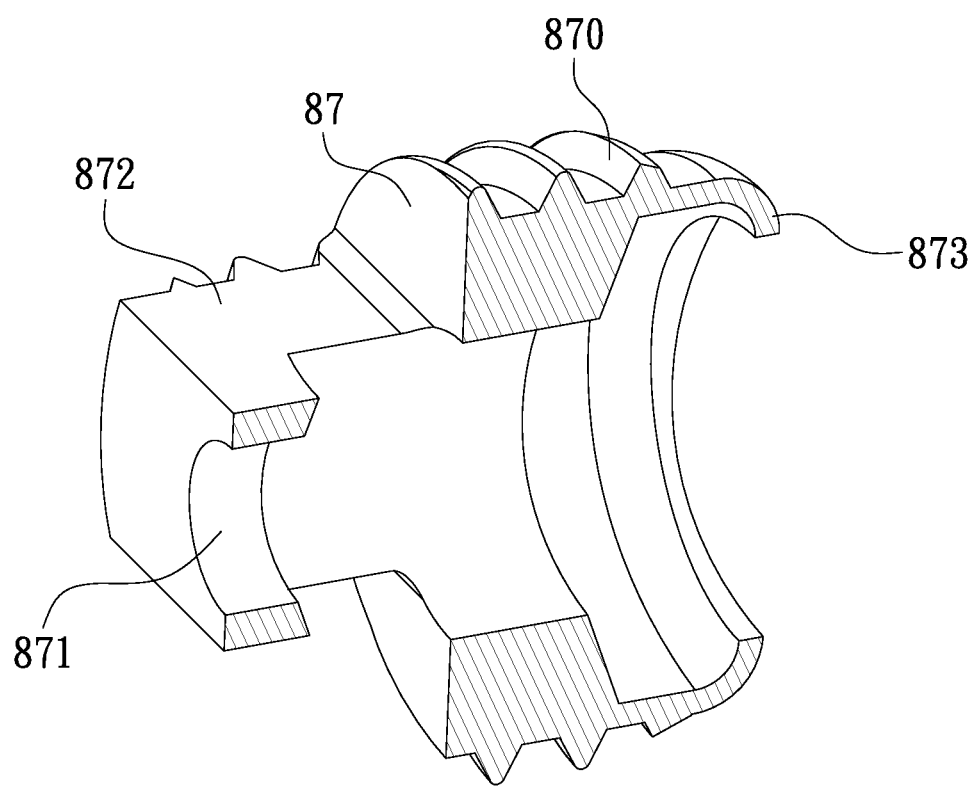
FIG. 8 is a cross-sectional perspective view showing the assembly of a mounting according to the preferred embodiment of the present invention.

With reference to FIG. 4, the valve bolt assembly 8 includes a valve bolt 81 formed in a column shape and having a head 811 formed on a first end of the valve bolt 81, multiple spaced ribs 812 adjacent to the head 811, and a projection 813 extending from a second end of the valve bolt 81; a spring 82 fitted with the valve bolt 81 and abutting against the multiple spaced ribs 812 of the valve bolt 81; a hollow sleeve 83 having a locking shoulder 831 extending from a first end of the hollow sleeve 83, a valve holder 834 formed on a second end of the hollow sleeve 83, a protrusion 832 and a recessed section 833 which are formed on an outer wall of the hollow sleeve 83 between the locking shoulder 831 and the valve holder 834. Referring to FIG. 6, the valve bolt 81 is fitted with the spring 82 and is put into the first end of the hollow sleeve 83 so that the spring 82 abuts against the valve holder 834 and is surrounded by the hollow sleeve 83; a washer 84 fitted in the recessed section 833 of the hollow sleeve 83; a second seal ring 85 fitted with a portion of the valve bolt 81 adjacent to the projection 813 and is positioned by a limiting element 86. Referring to FIG. 8, a mounting 87 includes a male screwing section 870, a central passage 871 defined in the mounting 87, a grip portion 872 formed on a first end of the mounting 87, an arcuate engagement shoulder 873 surrounding around a mouth of the mounting 87 and extending inward from a second end of the mounting 87. When the spring 82, the valve bolt 81, the second seal ring 85, the hollow sleeve 83 of the limiting element 86, and the mounting 87 are connected, the arcuate engagement shoulder 873 of the mounting 87 is engaged with the locking shoulder 831 of the hollow sleeve 83, the head 811 of the valve bolt 81 extends out of the central passage 871 of the mounting 87 so that the spring 82 pushes the second seal ring 85 of the valve bolt 81 to close the valve holder 834 of the hollow sleeve 83. The valve bolt assembly 8 includes a contact member 88 fitted on the head 811 of the valve bolt 811 securely. When the valve bolt assembly 8 is connected with the cap 7, the male screwing section 870 of the mounting 87 is screwed with the female screwing section 750 of the middle rib 75 of the cap 7, the protrusion 832 and the washer 84 of the valve bolt assembly 8 contact with the conical fringe 77 of the cap 7, and the valve holder 834 of the hollow sleeve 83, the second seal ring 85 of the valve bolt 81, and the limiting element 86 extend out of the orifice 760 of the post 76 of the cap 7. The valve bolt assembly 8 further includes a gasket 89 having an aperture 890 and fixed from the screw hole 72 of the cap 7, wherein after the aperture 890 passes through the valve bolt 81, the gasket 89 abuts against the stepped rib 74 of the cap 7; a third seal ring 711 fitted with the defining segment 71 of the cap 7; wherein after the defining segment 71 of the cap 7 is connected with the valve bolt assembly 8 and is moved into the first segment 41, the defining segment 71 is screwed with the opening 51 of the receiving seat 5 which is coupled with the fitting seat 6. In other words, the male threads 710 of the defining segment 71 of the cap 7 are screwed with the female threads 510 of the opening 51 of the receiving seat 5, and the at least one retainer 712 of the cap 7 is retained with the multiple recesses 511 of the receiving seat 5, as illustrated in FIGS. 3 and 5, hence the first segment 41 is connected with the second segment 42 safely and securely.

Figure 9:
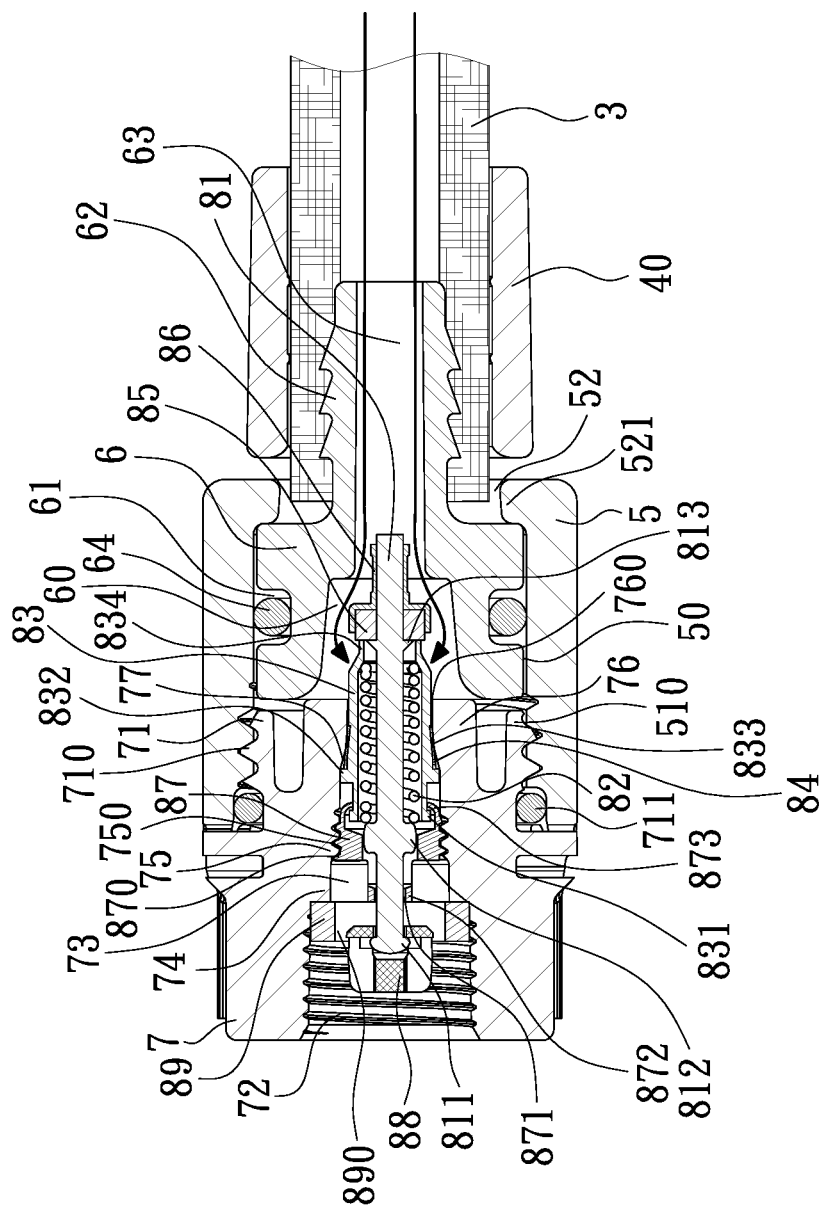
FIG. 9 is a perspective view showing the operation of the anti-spray joint structure of the connection hose of the vehicle air compressor according to the preferred embodiment of the present invention.

With reference to FIG. 9, when the button 11 of the box 1 is turned on, the compressed airs force the chemical sealant to flow, but the chemical sealant does not flow into the hollow sleeve 83 because the second seal ring 85 of the valve bolt 81 contacts with the valve holder 834 of the hollow sleeve 83 of the valve bolt assembly 8 tightly, thus avoiding the eruption of the chemical sealant.

Figure 10:
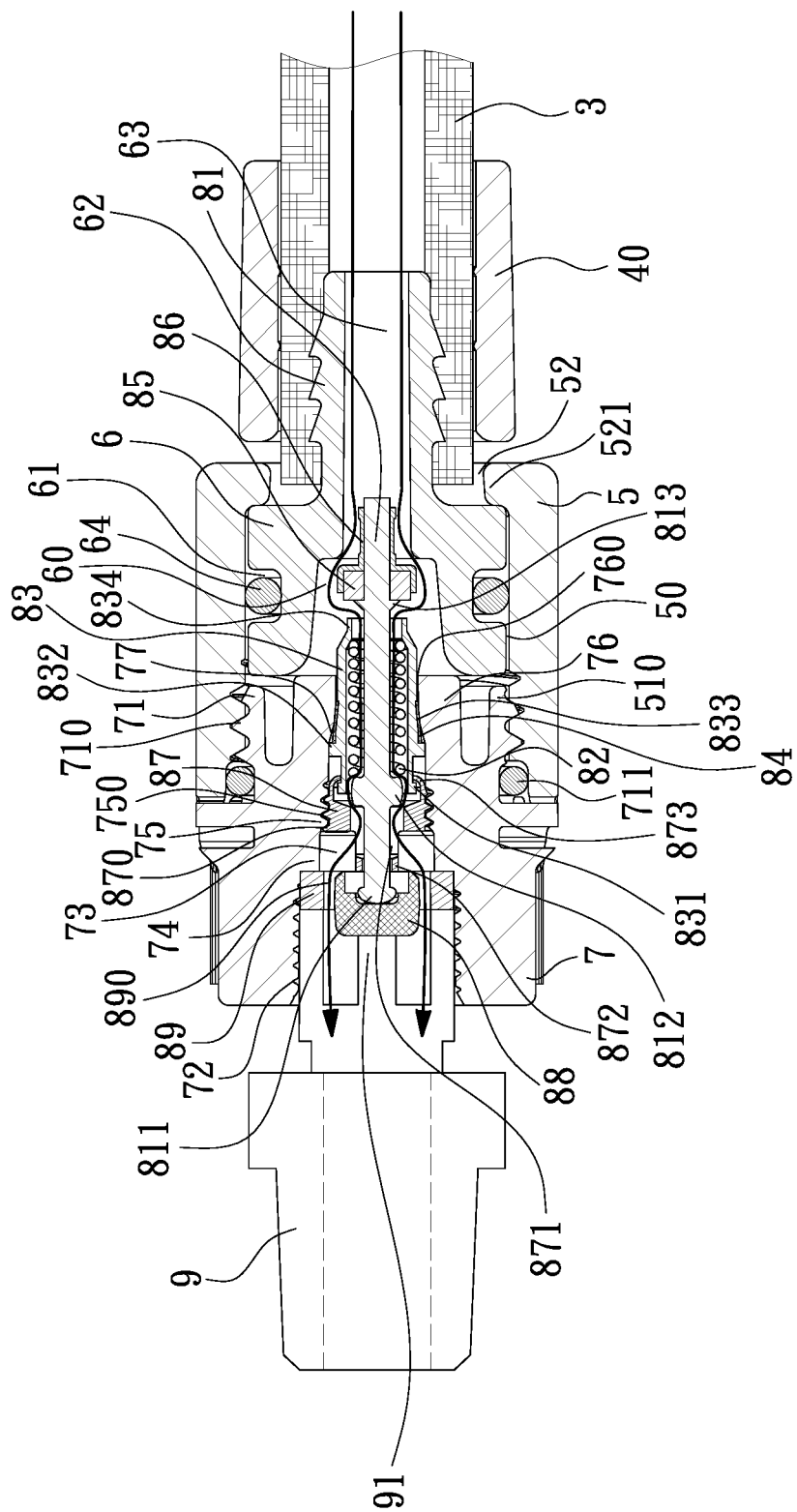
FIG. 10 is another perspective view showing the operation of the anti-spray joint structure of the connection hose of the vehicle air compressor according to the preferred embodiment of the present invention.

Referring to FIGS. 1 and 10, when the screw hole 72 of the cap 7 is screwed with the air nozzle 9 of the tire 99, the contact member 88 of the valve bolt 81 of the rear connector 4 abuts against a central needle 91 in the air nozzle 9 of the tire 99. Preferably, when the screw hole 72 of the rear connector 4 is screwed with the air nozzle 9 of the tire 99 completely, the central needle 91 of the air nozzle 9 is pushed by the valve bolt 81 to press the spring 82, the second seal ring 85 of the valve bolt 81 moves away from the valve holder 834 of the hollow sleeve 83 so that the hollow sleeve 83 is communicated. In the meantime, the chemical sealant are pushed by the airs to flow into the tire 99 from the conduit 63 of the fitting seat 6 via the cylindrical room 60, the hollow sleeve 83, the central passage 871 of the mounting 87, the channel 73 of the cap 7, the aperture 890 of the gasket 89, the screw hole 72, and the air nozzle 9, thus feeding the chemical sealant into the tire 99 and inflating the compressed airs into the tire 99.

Accordingly, the anti-spray joint structure of the rear connector 4 is located on the connection hose 3 and is configured to feed the chemical sealant and to inflate the compressed airs to the tire 99 which is broken. The anti-spray joint structure of the rear connector 4 comprises the first segment 41 and the second segment 42 removed from and connected with the first segment 41 easily. Preferably, the first segment 41 is connected with the second segment 42 which has the channel of different sizes and volumes so as to be applicable for different tires 99.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An anti-spray joint structure of a connection hose of a vehicle air compressor, the vehicle air compressor comprising:

a box including a body accommodated in the box and started by a power supply to produce compressed air;

a sealant supply can including an open segment extending downward and configured to accommodate chemical sealant, the sealant supply can including a supply tube arranged on the open segment; and a connection hose including a front connector connected on a first end of the connection hose and engaged with the supply tube of the sealant supply can, a rear connector connected on a second end of the connection hose and engageable with an air nozzle of a tire;

the anti-spray joint structure comprising:

a first segment, and a second segment removably connected with the first segment, wherein the first segment is connected with the second segment which has a channel of a size and a shape so as to be applicable for a corresponding tire and to avoid eruption of the chemical sealant and wherein the anti-spray joint structure is configured as the rear connector of the connection hose.

2. The anti-spray joint structure as claimed in claim 1, wherein the first segment has a receiving seat and a fitting seat, wherein the receiving seat has a cavity, an opening defined on a first end of the receiving seat, female threads formed on an inner wall of the opening, and a through hole which is defined on a second end of the receiving seat, has a stop shoulder extending inward around an inner wall of the through hole, and communicates with the cavity; the fitting seat includes a cylindrical room formed in a first end thereof, a groove defined around an outer wall of the fitting seat, a stepped fixing portion extending from a second end of the fitting seat, a conduit defined in a center of the stepped fixing portion and communicating with the cylindrical room, and a first seal ring fitted on the groove of the fitting seat; wherein the stepped fixing portion of the fitting seat is inserted through the cavity and the stop shoulder of the through hole from the opening of the receiving seat to fit with the second end of the connection hose, and a positioning ring is configured to fix the connection hose and the rear connector.

3. The anti-spray joint structure as claimed in claim 2, wherein the second segment has a cap and a valve bolt assembly, the cap includes a defining segment formed on a first end thereof and having male threads, a screw hole defined on a second end of the cap, the channel extending from an end of the screw hole and having a diameter which is less than a diameter of the screw hole, a stepped rib formed between the screw hole and the channel, a middle rib extending from the stepped rib away from the screw hole and the channel, a female screwing section formed around an inner wall of the middle rib, a post extending from an end of the middle rib away from the female screwing section and having a fixing orifice, and a conical fringe formed between an inner wall of the post and an inner wall of the middle rib.

4. The anti-spray joint structure as claimed in claim 3, wherein the valve bolt assembly includes a valve bolt formed in a columnar shape and having a head formed on a first end of the valve bolt, multiple spaced ribs adjacent to the head, and a projection extending from a second end of the valve bolt; a spring is fitted with the valve bolt and abutting against the multiple spaced ribs of the valve bolt; a hollow sleeve has a locking shoulder extending from a first end of the hollow sleeve, a valve holder formed on a second end of the hollow sleeve, and a protrusion and a recessed section are formed on an outer wall of the hollow sleeve between the locking shoulder and the valve holder.

5. The anti-spray joint structure as claimed in claim 4, wherein the valve bolt is fitted with the spring and is put into the first end of the hollow sleeve so that the spring abuts against the valve holder and is surrounded by the hollow sleeve; a second seal ring is fitted with a portion of the valve bolt adjacent to the projection, a mounting includes a male screwing section, and a central passage defined in the mounting; wherein when the spring, the valve bolt, the second seal ring, the hollow sleeve of the limiting element, and the mounting are connected, the head of the valve bolt extends out of the central passage of the mounting so that the spring pushes the second seal ring of the valve bolt to close the valve holder of the hollow sleeve; when the valve bolt assembly is connected with the cap, the male screwing section of the mounting is screwed with the female screwing section of the middle rib of the cap, and the valve holder of the hollow sleeve and the second seal ring of the valve bolt extend out of the orifice of the post of the cap.

6. The anti-spray joint structure as claimed in claim 5, wherein a washer is fitted in the recessed section of the hollow sleeve, the protrusion and the washer of the valve bolt assembly contact with the conical fringe of the cap; the second seal ring is positioned by a limiting element; the valve bolt assembly further includes a gasket having an aperture and fixed from the screw hole of the cap, wherein after the aperture passes through the valve bolt, the gasket abuts against the stepped rib of the cap; a third seal ring is fitted with the defining segment of the cap; wherein after the defining segment of the cap is connected with the valve bolt assembly and is moved into the first segment, the defining segment is screwed with the opening of the receiving seat which is coupled with the fitting seat, and the male threads of the defining segment of the cap are screwed with the female threads of the opening of the receiving seat.

7. The anti-spray joint structure as claimed in claim 5, wherein the mounting has a grip portion formed on a first end of the mounting, and the mounting has an arcuate engagement shoulder surrounding around a mouth of the mounting and extending inward from a second end of the mounting, wherein the arcuate engagement shoulder of the mounting is engaged with the locking shoulder of the hollow sleeve.

8. The anti-spray joint structure as claimed in claim 4, wherein the valve bolt assembly further includes a contact member fitted on the head of the valve bolt.

9. The anti-spray joint structure as claimed in claim 6, wherein the receiving seat further includes multiple recesses defined on a distal end of the opening; wherein at least one retainer surround an outer wall of the cap between the defining segment and the screw hole, and the at least one retainer of the cap is retained with the multiple recesses of the receiving seat.

* * * * *